US010829103B2

(12) United States Patent
Heyne et al.

(10) Patent No.: US 10,829,103 B2
(45) Date of Patent: Nov. 10, 2020

(54) AGRICULTURAL MACHINE

(71) Applicant: CLAAS E-Systems KGaA mbH & Co. KG, Guterslog (DE)

(72) Inventors: Benjamin Heyne, Osnabruck (DE); Volker Brill, Schloß Holte (DE); Christian Laing, Harsewinkel (DE); Nermine Khairallah, Bielefeld (DE)

(73) Assignee: CLAAS E-Systems GmbH, Dissen (DE)

( * ) Notice: Subject to any disclaimer, the term of this patent is extended or adjusted under 35 U.S.C. 154(b) by 435 days.

(21) Appl. No.: 15/850,800

(22) Filed: Dec. 21, 2017

(65) Prior Publication Data

US 2018/0177133 A1    Jun. 28, 2018

(30) Foreign Application Priority Data

Dec. 22, 2016  (DE) .................. 10 2016 125 397

(51) Int. Cl.
*B60W 10/30*    (2006.01)
*B60W 20/13*    (2016.01)
(Continued)

(52) U.S. Cl.
CPC ........... *B60W 10/30* (2013.01); *A01D 69/025* (2013.01); *B60L 1/00* (2013.01); *B60W 10/26* (2013.01);
(Continued)

(58) Field of Classification Search
CPC ........ B60L 53/00; B60L 53/53; H02J 7/1446; H02J 7/0031; H02J 9/002; B60W 20/13;
(Continued)

(56) References Cited

U.S. PATENT DOCUMENTS 7,463,139 B2 *  12/2008  Burlak .................... B60D 1/62
                                               280/423.1
2002/0084786 A1   7/2002  Egami
(Continued)

FOREIGN PATENT DOCUMENTS

DE         3936638 C1     3/1991
DE        19952112 A1     6/2001
(Continued)

OTHER PUBLICATIONS

European Search Report for European Application No. EP17186253 dated Apr. 3, 2018 (7 pages).

*Primary Examiner* — Edward Tso
*Assistant Examiner* — Aaron Piggush
(74) *Attorney, Agent, or Firm* — Lempia Summerfield Katz LLC

(57) ABSTRACT

An agricultural machine for conducting an agricultural working process includes a combustion engine (2), electrical consumers (3-8), a chargeable electrical battery (9) for electrically supplying the consumers (3-8) and a monitor module (10) for monitoring the charging level of the battery (9). It is proposed that some of the electrical consumers (3-8) of the agricultural machine (1) are peripheral consumers (3-8) for providing functions in a parking state of the agricultural machine (1), in which the combustion engine (2) is shut off, that a power management module (11) is provided, which in the parking state of the agricultural machine (1) monitors the charging level of the battery (9) via the monitor module (11) and deactivates at least one peripheral consumer (3-8), when the charging level falls below a threshold level.

18 Claims, 2 Drawing Sheets

(51) Int. Cl.
*A01D 69/02* (2006.01)
*B60W 10/26* (2006.01)
*B60L 1/00* (2006.01)
*B60W 30/18* (2012.01)
*B60W 30/188* (2012.01)
*H02J 7/00* (2006.01)
*H02J 9/00* (2006.01)
*B60W 50/00* (2006.01)

(52) U.S. Cl.
CPC ...... *B60W 20/13* (2016.01); *B60W 30/18054* (2013.01); *B60W 30/1886* (2013.01); *H02J 7/0031* (2013.01); *H02J 9/002* (2013.01); *B60W 2050/0094* (2013.01); *B60W 2300/15* (2013.01); *B60W 2510/244* (2013.01); *B60W 2510/248* (2013.01)

(58) Field of Classification Search
CPC .. B60W 10/26; B60W 10/30; B60W 30/1886; B60W 30/18054; A01D 69/025

USPC .......................... 320/104, 132, 134, 136, 162
See application file for complete search history.

(56) References Cited

U.S. PATENT DOCUMENTS

| | | | |
|---|---|---|---|
| 2010/0019718 A1* | 1/2010 | Salasoo | B60L 3/0046 320/103 |
| 2016/0244009 A1* | 8/2016 | Demmerle | B60R 16/033 |
| 2016/0316621 A1* | 11/2016 | Fritz | B60L 1/003 |

FOREIGN PATENT DOCUMENTS

| | | | |
|---|---|---|---|
| EP | 0992400 A2 | 4/2000 | |
| EP | 2778003 A1 | 9/2014 | |
| EP | 3088235 A1 | 11/2016 | |

* cited by examiner

AGRICULTURAL MACHINE

CROSS REFERENCE TO RELATED APPLICATIONS

This application claims priority to German Patent Application No. DE 102016125397.9, filed Dec. 22, 2016, the entire disclosure of which is hereby incorporated herein by reference.

FIELD OF THE INVENTION

This application is directed to an agricultural machine for conducting an agricultural working process.

BACKGROUND

The known agricultural machine (EP 2 778 003 A1) includes a monitor module for monitoring the charging level of the battery of a hybrid drive for a combine harvester. Here, the electrical consumers are controlled with respect to the charging level of the battery, in order to increase the power efficiency during conducting of the agricultural working process.

During standstill of the agricultural machine, when the combustion engine of the agricultural machine is shut down, the power management becomes a challenge. This is true because in this particular state, charging of the battery by the combustion engine is not possible.

SUMMARY

In order to increase the efficiency of agricultural processes such as harvesting processes, in particular in order to reduce machine downtime to a minimum, it is of important to use the available power in an optimized way. Presently the power management of the electrical power, which is provided by a chargeable battery, is in focus.

In one aspect, an agricultural machine is provided with improved power management in view of the electrical power provided by the electrical battery.

In general, during the parking state of the agricultural machine, the battery is allowed to electrically supply certain electrical consumers, until the charging level of the battery falls below a threshold level. With this overall concept various electrical functions may be provided even during the parking state of the agricultural machine, however, without facing the risk of lacking the electrical power needed for a subsequent electrical start of the combustion engine.

In detail it is proposed that some of the electrical consumers of the agricultural machine are peripheral consumers for providing functions that may be performed in a parking state of the agricultural machine, in which parking state the combustion engine is shut off. It is further proposed that a power management module is provided, which in the parking state of the agricultural machine monitors the charging level of the battery via the monitor module and deactivates at least one peripheral consumer, when the charging level falls below a threshold level.

The parking state of the agricultural machine is presently the state of the agricultural machine, which allows the user to leave the agricultural machine. Here, the parking state includes the standstill of the agricultural machine altogether and the standstill of the combustion engine in particular. In contrast, the agricultural machine may be in a working state, during which the agricultural working process is being conducted, in particular, and during which the combustion engine is running.

Besides the above noted peripheral consumers for providing functions in a parking state of the agricultural machine, the agricultural machine also comprises primary electrical consumers, which provide functions in the working state of the agricultural machine for conducting the agricultural working process. One of those primary consumers is the electrical starter drive for the combustion engine.

The preferred embodiments are directed to a control structure which is well suited for the proposed concept of providing electrical functions in the parking state of the agricultural machine. In one embodiment, the primary electrical consumers and the peripheral electrical consumers are electrically supplied via two separate power circuits, namely a primary power circuit and a peripheral power circuit. With this it is possible to completely separate the primary power circuit from the battery, still allowing the peripheral consumers to be electrically supplied by the battery via the peripheral power circuit.

Various embodiments are directed to preferred strategies for controlling the charging level of the battery in the parking state of the agricultural machine. According to the one preferred embodiment, the threshold level is being set and the peripheral consumers are being deactivated such that it is guaranteed that the charging level of the battery is always still sufficient to electrically start the combustion engine.

According to one embodiment, the deactivation sequence is based on categorizing the peripheral consumers with respect to power consumption. This categorization is a simple way to find the right deactivation sequence even if a large number of peripheral consumers have to be organized.

According to one embodiment, at least one peripheral consumer may be brought into a power saving standby state, out of which the respective consumer may be activated in a time efficient manner. It may be advantageous to keep some peripheral consumers in such a standby state, when the agricultural machine is in the parking state, such that when the user enters the agricultural machine again to conduct an agricultural working process, he does not have to wait for time consuming boot cycles.

BRIEF DESCRIPTION OF THE DRAWINGS

Further details, features, goals and advantages of the present invention shall be described in the following based on the illustration of a preferred embodiment. In the illustration, the figures show the following.

DETAILED DESCRIPTION

Figure 1:
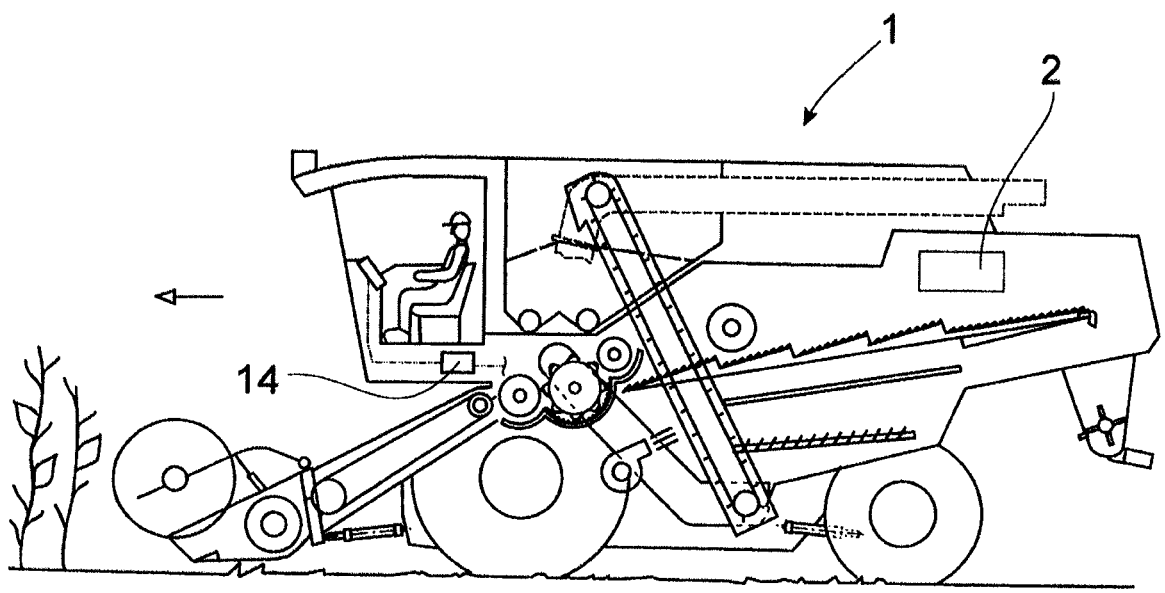
FIG. 1—a schematic diagram of a proposed agricultural machine, which is suitable for conducting a harvesting process and FIG. 2—a schematic diagram of the control structure of the agricultural machine.

The agricultural machine 1 shown in FIG. 1 is designed as a combine for performing a harvesting process. However, the proposed solution may be applied to any agricultural machine, as will be noted below.

The proposed agricultural machine 1 serves for conducting an agricultural working process such as an above noted harvesting process. For this, the agricultural machine 1 includes a combustion engine 2 and electrical consumers 3-8, which will be explained later.

Figure 2:
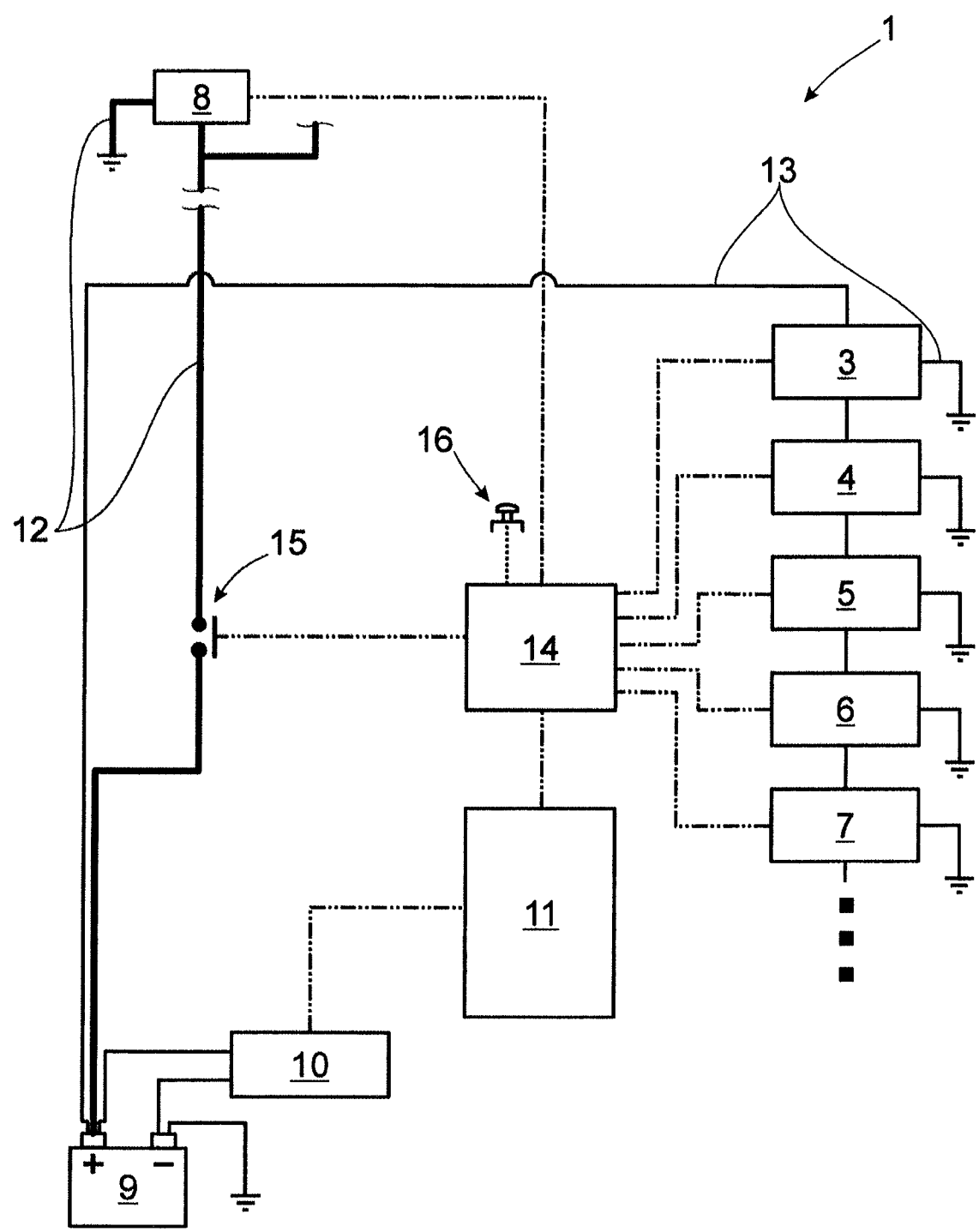

As shown in FIG. 2 the agricultural machine 1 includes a chargeable battery 9 for electrically supplying the consumers 3-8. The wording "battery" is to be understood broadly. A battery in this sense may also be an arrangement of two or more batteries or a battery pack that may be charged. Charging of the electrical battery 9 here and preferably takes place by the combustion engine 2 by the combustion engine 2 being provided with an electrical generator.

Depending on the kind of the agricultural machine, the combustion engine 2 may serve for driving different working organs of the agricultural machine 1. It may also serve as the drive for motorized movement of the agricultural machine 1.

Furthermore, the proposed agricultural machine 1 includes a monitor module 10 for monitoring the charging level of the battery 9. The charging level of the battery 9, here and preferably, is represented by the voltage of the battery 9.

Some of the electrical consumers of the agricultural machine 1 are peripheral consumers 3-7, which provide functions in a parking state of the agricultural machine 1. This means that the peripheral consumers 3-7 provide functions at least in the parking state. Depending on the kind of consumer, however, it may well be that this consumer provides its function also in the working state of the agricultural machine 1. In the parking state of the agricultural machine 1 the combustion engine 2 is shut off as noted above.

The peripheral consumer 3-7 providing a function presently means that the peripheral consumer 3-7 is actually performing a task like heating the interior or that the peripheral consumer 3-7 is in a standby mode monitoring to be woken up. In the last noted case the function provided by the peripheral consumer 3-7 is the monitoring process.

In order to prevent the battery 9 from running dead in an uncontrolled way, a power management module 11 is provided, which in the parking state of the agricultural machine 1 monitors the charging level of the battery 9 via the monitor module 10 and deactivates at least one peripheral consumer 3-7 when the charging level falls below a threshold level. As the charging level of the battery 9 here and preferably is represented by the voltage of the battery 9, the threshold is preferably a threshold voltage.

It is to be noted that the possibility of allowing to electrically supply peripheral consumers 3-7 in the parking state of the agricultural machine 1, without running the risk of losing control of the battery power is one of the exceptional advantages of the present embodiments.

Besides the peripheral consumers 3-7, the agricultural machine 1 includes primary electrical consumers 8, only one of which is shown in FIG. 2. Those primary electrical consumers 8 provide functions in the working state of the agricultural machine 1 for conducting the agricultural working process. The primary electrical consumer 8, which is shown in FIG. 2, is the starter drive of the combustion engine 2.

As may be taken from FIG. 2, a primary power circuit 12 is provided for the primary consumers 8, while, separately from the primary power circuit 12, a peripheral power circuit 13 is provided for the peripheral consumers 3-7. Both power circuits 12, 13 may be powered by the battery, as is shown in FIG. 2 as well.

One central component of the control structure in FIG. 2 is a machine control 14, which is coupled to the consumers 3-8 on the one hand and to the power management module 11 on the other hand. The machine control 14 is coupled to various other components such as the motor control of the combustion engine 2. The machine control 14 may be centralized, as shown in FIG. 2 or may be decentralized, than comprising various control modules that communicate with each other. The machine control 14 coordinates the consumers 3-8 as well as the combustion engine 2.

The communication between the machine control 14 and the consumers 3-8 as well as with the power management module 11 is here and preferably realized via a bus system. This bus system is indicated by chain double dotted lines.

When the agricultural machine 1 is in the parking state, the primary power circuit 12 is preferably separated from the battery 9. In FIG. 2, for this separation a power switch 15 is realized, which may be actuated by the machine control 14. Accordingly, the power switch 15 provides the general function of a relay. The same power switch 15 may be actuated via the machine control 14, when a manual emergency switch 16 is being pressed.

From the overall control structure shown in FIG. 2 it becomes clear that in the parking state, due to the open power switch 15, the primary consumers 8 are safely separated from any electrical power. At the same time, the peripheral consumers 3-7 may be electrically supplied via the peripheral power circuit 13.

The proposed solution may be applied for a variety of peripheral consumers 3-7. For example, at least one peripheral consumer 3 may provide a comfort function like an interior heating or the like. In addition or as an alternative at least peripheral consumer 4 may provide a driver assistance function such as a planning function for the working process to be conducted. In addition or as an alternative, at least one peripheral consumer 5, 6 may provide a communication function like off-site diagnostics and/or telematics. In addition or as an alternative, at least one peripheral consumer 7 may provide an access control function like a passive entry function, allowing the user to enter the agricultural machine 1 without having to unlock the respective door lock manually with a mechanical key.

It is of importance for the proposed solution that the threshold level is laid out with respect to the power consumption of the peripheral consumers 3-7. Preferably, the threshold level is set and the peripheral consumers are deactivated such that, in the parking state of the agricultural machine 1, the charging level of the battery 9 is always sufficient to electrically start the combustion engine 2. This guarantees that even if the charging level of the battery 9 is low, the combustion engine 2 may still charge the battery 9 after the combustion engine 2 has been electrically started.

Generally, the threshold level may be a fixed value. However, it is preferred that the threshold level is set by the power management module 11 dependent of the ageing condition of the battery 9 and/or of surrounding conditions such as temperature, humidity or the like. This guarantees a high operational safety in view of electrically starting the combustion engine 2 even in unfavorable surrounding conditions.

In one alternative for the proposed deactivation of peripheral consumers 3-7, in the parking state of the agricultural machine 1, the power management module 11 deactivates a predefined group of peripheral consumers 3-7. Preferably, this group includes those peripheral consumers 3-7 that show an exceptionally high power consumption. In a further preferred embodiment it is provided that, in the parking state of the agricultural machine 1, the power management module 11 deactivates all peripheral consumers 3-7 when the charging level falls below the threshold level.

A further improvement of the optimization of the power management may be realized, when, in the parking state of the agricultural machine 1, the power management module 11 defines a deactivation sequence, in which the peripheral consumers 3-7 are being deactivated during discharging of the battery 9. In a simple embodiment, this deactivation sequence may be based on a predefined and thereby fixed sequence.

A systematic approach for the definition of the deactivation sequence, however, is based on categorizing the peripheral consumers 3-7 with respect to various aspects. Preferably, different categories of consumption are defined for the peripheral consumers 3-7, which categories reflect the power consumption of the respective consumer 3-7. This may be done with respect to the activated state or to the power saving standby state of the respective consumer 3-7. Preferably, the power management module 11 defines the deactivation sequence based on the above noted categories, the respective consumers 3-7 are assigned to. This systematic approach allows the management of a large number of peripheral consumers 3-7 with little effort even if additional consumers 3-7 are being added to the agricultural machine 1.

Each of the peripheral consumers 3-7 may be brought into an activated state, in which they provide their full functional range, while the peripheral consumers 3-7 in the deactivated state do not provide a function and therefore, preferably, do not or hardly consume any electrical power. An example for this is the peripheral consumer 3, which provides the function of an interior heating.

The other peripheral consumers 4-7 each includes an electronic control unit (ECU), which allows to bring the respective consumer 4-7 into different operational states. Preferably, at least peripheral consumer 4-7 may be brought into a power saving standby state in which it preferably keeps just those processes running, that are necessary for a time efficient activation of the consumer 4-7. With this it is possible to switch the consumer 4-7 into its above noted activated state, without having to wait for a time consuming boot cycle. Preferably, the consumer in its standby state consumes reduced electrical power compared to the activated state. It is preferred that in the parking state of the agricultural machine 1 at least one of the peripheral consumers 4-7 is/are being transferred into the standby state by the machine control 14. This may also be provided with a certain time offset, such that the respective consumer 4-7 automatically falls into the standby state after a certain predefined time interval.

It was noted above that the proposed solution may be applied to all kinds of agricultural machines 1. Here and preferably the agricultural machine 1 is a self-propelled agricultural machine, in particular a combine. However, the agricultural machine 1 may well be a field chopper, a tractor or the like. All explanations given for the shown agricultural machine 1 are fully applicable for all other agricultural machines 1.

LIST OF REFERENCE NUMBERS 1 agricultural machine
2 combustion engine
3-8 consumers
9 battery
10 monitor module
11 power management module
12 primary power circuit
13 peripheral power circuit
14 machine control
15 power switch
16 emergency switch

What is claimed is:

1. An agricultural machine for conducting an agricultural working process, comprising:
    a combustion engine;
    electrical consumers, wherein at least some of the electrical consumers of the agricultural machine comprise one or more primary electrical consumers for providing functions in a working state of the agricultural machine for conducting an agricultural working process and peripheral electrical consumers for providing functions in a parking state of the agricultural machine, wherein in the parking state the combustion engine is shut off, wherein at least some of the peripheral electrical consumers are assigned based on power consumption into one of a first category or a second category;
    a chargeable electrical battery for electrically supplying the electrical consumers;
    a monitor module for monitoring a charging level of the battery; and
    a power management module, which in the parking state of the agricultural machine, is configured to:
        deactivate all of the one or more primary electrical consumers as a group;
        monitor the charging level of the battery via the monitor module; and
        deactivate different groups of the peripheral electrical consumers by:
            determining whether the charging level falls below a threshold level; and
            responsive to determining that the charging level falls below the threshold level, deactivating the peripheral electrical consumers in a sequence by deactivating one or more peripheral electrical consumers assigned with respect to power consumption to one of the first category or the second category prior to deactivating the one or more peripheral electrical consumers assigned to another of the first category or the second category.

2. An agricultural machine according to claim 1, further comprising a primary power circuit comprising at least one power switch for routing power from the battery to the one or more primary electrical consumers and a peripheral power circuit for routing power from the battery to the peripheral electrical consumers, wherein the primary power circuit and the peripheral power circuit are powered by the battery;
    wherein the at least one power switch is configured to electrically separate the primary power circuit from the battery so that all of the one or more primary electrical consumers do not receive power responsive to control of the at least one power switch; and
    wherein the power management module is configured to separate different sections the peripheral power circuit from the battery in order to deactivate the peripheral electrical consumers assigned to different categories such that the one or more peripheral electrical consumers assigned with respect to power consumption to the one of the first category or the second category is deactivated while the one or more peripheral electrical consumers assigned to another of the first category or the second category is not deactivated.

3. An agricultural machine according to claim 2, wherein, in the parking state of the agricultural machine, the primary power circuit is separated from the battery so that all of the one or more primary electrical consumers do not receive power.

4. An agricultural machine according to claim 1 wherein at least one peripheral electrical consumer provides a comfort function.

5. An agricultural machine according to claim 1 wherein at least one peripheral electrical consumer provides a driver assistance function.

6. An agricultural machine according to claim 1 wherein at least one peripheral electrical consumer provides a communication function.

7. An agricultural machine according to claim 1 wherein at least one peripheral electrical consumer provides an access control function.

8. An agricultural machine according to claim 1 wherein the threshold level is set and the peripheral electrical consumers are deactivated such that, in the parking state of the agricultural machine, the charging level of the battery is always sufficient to electrically start the combustion engine.

9. An agricultural machine according to claim 1 wherein the threshold level is set by the power management module depending on an aging condition of the battery.

10. An agricultural machine according to claim 1 wherein the threshold level is set by the power management module depending on surrounding conditions.

11. An agricultural machine according to claim 1 wherein, in the parking state of the agricultural machine, the power management module deactivates all peripheral electrical consumers when the charging level falls below the threshold level.

12. An agricultural machine according to claim 1, wherein the peripheral electrical consumers in an activated state provide their full functional range and wherein the peripheral electrical consumers in a deactivated state do not provide a function.

13. An agricultural machine according to claim 1, wherein the agricultural machine is a self-propelled agricultural machine.

14. An agricultural machine according to claim 13 wherein the self-propelled agricultural machine comprises a combine.

15. An agricultural machine according to claim 1, wherein the peripheral electrical consumers are categorized into the first category and the second category based on the power consumption of the peripheral electrical consumers in an active state.

16. An agricultural machine according to claim 1, wherein the peripheral electrical consumers are categorized into the first category and the second category based on the power consumption of the peripheral electrical consumers in a standby state.

17. An agricultural machine according to claim 1, wherein at least one of the peripheral electrical consumers includes an active state and a standby state, the at least one of the peripheral electrical consumers consuming less power in the standby state; and
    wherein the at least one of the peripheral electrical consumers automatically transitions into the standby state after a predetermined time interval.

18. An agricultural machine according to claim 17, further comprising machine control configured to control operation of the at least one of the peripheral electrical consumers; and
    wherein the machine control is configured to automatically control transition of the at least one of the peripheral electrical consumers into the standby state after the predetermined time interval.

\* \* \* \* \*